United States Patent
Fukuhara

(10) Patent No.: US 11,365,271 B2
(45) Date of Patent: Jun. 21, 2022

(54) VINYL POLYMER PRODUCTION METHOD

(71) Applicant: KURARAY CO., LTD., Kurashiki (JP)

(72) Inventor: Tadahito Fukuhara, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 193 days.

(21) Appl. No.: 16/473,682

(22) PCT Filed: Dec. 27, 2017

(86) PCT No.: PCT/JP2017/047106
§ 371 (c)(1),
(2) Date: Jun. 26, 2019

(87) PCT Pub. No.: WO2018/124242
PCT Pub. Date: Jul. 5, 2018

(65) Prior Publication Data
US 2019/0330396 A1    Oct. 31, 2019

(30) Foreign Application Priority Data
Dec. 28, 2016 (JP) .............................. JP2016-256532

(51) Int. Cl.
C08F 114/06 (2006.01)
C08J 3/05 (2006.01)
C08L 29/04 (2006.01)

(52) U.S. Cl.
CPC .............. C08F 114/06 (2013.01); C08J 3/05 (2013.01); C08L 29/04 (2013.01); C08L 2201/54 (2013.01)

(58) Field of Classification Search
CPC .... C08F 114/06; C08L 2201/54; C08L 29/04; C08J 3/05
See application file for complete search history.

(56) References Cited

U.S. PATENT DOCUMENTS

| | | | |
|---|---|---|---|
| 6,022,932 A | 2/2000 | Ooura et al. | |
| 2003/0008972 A1 | 1/2003 | Kato et al. | |
| 2004/0186232 A1 | 9/2004 | Shibutani | |
| 2008/0176995 A1 | 7/2008 | Ooura et al. | |
| 2009/0111940 A1 | 4/2009 | Kato et al. | |
| 2010/0041828 A1 | 2/2010 | Kato et al. | |
| 2017/0198068 A1 | 7/2017 | Kozuka et al. | |

FOREIGN PATENT DOCUMENTS

| | | | |
|---|---|---|---|
| EP | 2 154 161 A1 * | 2/2010 | ............... C08F 2/20 |
| JP | 51-45189 | 4/1976 | |
| JP | 56-11913 A | 2/1981 | |
| JP | 10-67806 A | 3/1998 | |
| JP | 10-95804 A | 4/1998 | |
| JP | 2002-30104 A | 1/2002 | |
| JP | 2003-246806 A | 9/2003 | |
| JP | 2004-250695 A | 9/2004 | |
| JP | 2008-202034 A | 9/2008 | |
| WO | WO 2007/119735 A1 | 10/2007 | |
| WO | WO 2015/182567 A1 | 12/2015 | |

OTHER PUBLICATIONS

U.S. Appl. No. 16/473,773, filed Jun. 26, 2019, Tadahito Fukuhara, et al.
International Search Report in PCT/JP2017/047106 filed on Dec. 27, 2017.
Extended European Search Report dated May 28, 2020 in European Patent Application No. 17885922.9, 6 pages.

\* cited by examiner

*Primary Examiner* — Robert D Harlan
(74) *Attorney, Agent, or Firm* — Oblon, McClelland, Maier & Neustadt, L.L.P.

(57) ABSTRACT

A method for producing a vinyl polymer by suspension-polymerizing a vinyl compound in the presence of a dispersion stabilizer, wherein the dispersion stabilizer contains a polyvinyl alcohol and a composition containing a modified polyvinyl alcohol and a compound; the modified polyvinyl alcohol contains double bonds derived from an unsaturated carboxylic acid or a derivative thereof in side chains; the compound is a compound having two or more hydroxy groups bonded to a conjugated double bond; the modified polyvinyl alcohol has a saponification degree and a viscosity-average polymerization degree different from those of the polyvinyl alcohol; a content of the compound in the composition is 0.001 parts by mass or more and less than 5 parts by mass based on 100 parts by mass of the modified polyvinyl alcohol; and a mass ratio of the composition to the polyvinyl alcohol is 50/50 to 90/10.

4 Claims, No Drawings

VINYL POLYMER PRODUCTION METHOD

TECHNICAL FIELD

The present invention relates to a method for producing a vinyl polymer by suspension-polymerizing a vinyl compound in the presence of a dispersion stabilizer for polymerization containing a polyvinyl alcohol.

BACKGROUND ART

Polyvinyl alcohols (hereinafter, sometimes abbreviated as "PVA") have been used for various products such as an adhesive, a paper coating agent, a polarizing film, a water-soluble film, a medicine, a cosmetic composition, and a dispersion stabilizer for suspension polymerization of a vinyl compound (for example, vinyl chloride). In many products, a PVA is less colored and is white, resulting in increasing an additional value of product. It is further known that the presence of a reactive group such as a double bond in a PVA can improve a variety of performances or provide special effects.

PVAs are extensively used as a dispersion stabilizer for suspension polymerization of a vinyl compound (Patent Reference Nos. 1 to 5).

It has been proposed that a heat-treated PVA is used for a polymerization reaction in order to improve stability during polymerization of vinyl chloride (polymerization stability) (Patent Reference Nos. 1 to 3). However, the use of such a PVA as a dispersion stabilizer in suspension polymerization of a vinyl chloride has not been satisfactorily effective in terms of polymerization stability. Furthermore, such a conventional PVA has very bad hue, thus leading to bad hue of a vinyl polymer produced.

Patent Reference No. 4 has described a dispersion stabilizer for suspension polymerization containing a polyvinyl alcohol having double bonds in side chains produced by acetalizing a polyvinyl alcohol by a monoaldehyde having an olefinic unsaturated double bond. The use of a dispersion stabilizer for suspension polymerization as described in Patent Reference No. 4 in a polymerization reaction is effective to some degree for improvement of hue, but not satisfactorily effective for polymerization stability or plasticizer absorbability of a vinyl polymer produced.

Furthermore, an acid is used in producing a polyvinyl alcohol described in Patent Reference No. 4, so that an expensive facility which is acid-resistant is required. Furthermore, a monoaldehyde having a double bond used for producing the polyvinyl alcohol has problems; for example, it is expensive, unstable in the air, sometimes specified as a poison, less handleable due to irritating smell and starting materials are less available.

Patent Reference No. 5 has described a dispersion stabilizer consisting of a polyvinyl alcohol having double bonds in side chains produced by esterifying a polyvinyl alcohol with a carboxylic acid having an unsaturated double bond or a salt thereof. It has described that the polyvinyl alcohol used for the dispersion stabilizer can be produced by a convenient method using an inexpensive carboxylic acid.

However, a polyvinyl alcohol having double bonds in side chains which is produced by a conventional method unsatisfactorily improves hue, and, therefore, when a vinyl compound is polymerized using a dispersion stabilizer consisting of the polyvinyl alcohol, hue of a vinyl polymer produced is insufficiently improved. Furthermore, a dispersion stabilizer described in Patent Reference No. 5 contains water, so that when a vinyl compound is suspension-polymerized using this dispersion stabilizer, fisheyes are formed in a vinyl polymer obtained.

PRIOR ART REFERENCES

Patent References

Patent Reference No. 1: JP 51-45189 A
Patent Reference No. 2: JP 10-67806 A
Patent Reference No. 3: JP 2004-250695 A
Patent Reference No. 4: WO 2015/182567 A1
Patent Reference No. 5: WO 2007/119735 A1

SUMMARY OF THE INVENTION

Problems to be Solved by the Invention

To solve the above problems, an objective of the present invention is to provide a method for producing a vinyl polymer, wherein suspension polymerization of a vinyl compound is highly stable while coloring of the polymer obtained and fisheyes in the polymer are prevented.

Means for Solving the Problems

After intensive investigation for solving the above problems, the inventors have achieved a composition (C) containing a modified polyvinyl alcohol (A) having a certain amount of double bonds derived from an unsaturated carboxylic acid or a derivative thereof in side chains and a particular compound (B). The inventors have then found that suspension polymerization of a vinyl compound is stabilized using a dispersion stabilizer for suspension polymerization containing the composition (C) and a polyvinyl alcohol (E). Furthermore, it has been found that coloring of a vinyl polymer obtained and fisheyes in the polymer can be prevented.

Specifically, the above problems can be solved by providing a method for producing a vinyl polymer by suspension-polymerizing a vinyl compound in the presence of a dispersion stabilizer for suspension polymerization, wherein the dispersion stabilizer comprises a composition (C) comprising a modified polyvinyl alcohol (A) and a compound (B), as well as a polyvinyl alcohol (E); the modified polyvinyl alcohol (A) comprises 0.01 mol % or more and less than 2 mol % of double bonds derived from an unsaturated carboxylic acid or a derivative thereof in side chains; the modified polyvinyl alcohol (A) has a saponification degree of 65 mol % or more and less than 77 mol % and a viscosity-average polymerization degree of 400 or more and less than 1500; the compound (B) is a compound having two or more hydroxy groups bonded to a conjugated double bond, or a salt or oxide thereof; the polyvinyl alcohol (E) has a saponification degree of 77 mol % or more and less than 97 mol % and a viscosity-average polymerization degree of 1500 or more and less than 5000; a content of the compound (B) in the composition (C) is 0.001 parts by mass or more and less than 5 parts by mass based on 100 parts by mass of the modified polyvinyl alcohol (A); and a mass ratio (C/E) of the composition (C) to the polyvinyl alcohol (E) is 50/50 to 90/10.

Here, it is preferable that the compound (B) is a compound having two or more hydroxy groups bonded to a carbon constituting an aromatic ring, or a salt or oxide thereof. It is also preferable that the composition (C) is a powder and the powder has a yellow index of less than 50.

Effects of the Invention

According to a production method of the present invention, a polymerization reaction is stable and formation of coarse particles decreases. Furthermore, coloring of the polymer obtained and fisheyes in the polymer can be prevented.

MODES FOR CARRYING OUT THE INVENTION (Composition (C))

A composition (C) used in the present invention contains a particular amount of a modified polyvinyl alcohol (A) having double bonds derived from an unsaturated carboxylic acid or a derivative thereof in side chains (hereinafter, sometimes abbreviated as "modified PVA (A)"), and a particular amount of a compound (B). A preferable method for producing a composition (C) used in the present invention is, but not limited to, a method comprising reacting a polyvinyl alcohol (D) and an unsaturated carboxylic acid or a derivative thereof in the presence of a compound (B). Herein, a polyvinyl alcohol (D) is a PVA free of double bonds in side chains (hereinafter, sometimes referred to as "PVA(D)" or "starting PVA").

(Modified PVA (A))

The above starting PVA(PVA(D)) can be produced by polymerizing a vinyl ester monomer in accordance with a conventionally known method such as bulk polymerization, solution polymerization, suspension polymerization, emulsion polymerization and dispersion polymerization. From the industrial point of view, preferred are solution polymerization, emulsion polymerization and dispersion polymerization. Polymerization can be carried out by any style of batch polymerization, semi-batch polymerization and continuous polymerization.

Examples of a vinyl ester monomer which can be used for polymerization include vinyl acetate, vinyl formate, vinyl propionate, vinyl caprylate and vinyl versate. Among these, vinyl acetate is preferable from the industrial point of view.

In polymerization of a vinyl ester monomer, a vinyl ester monomer can be copolymerized with another monomer without departing from the scope of the present invention. Examples of other monomers which can be used include α-olefins such as ethylene, propylene, n-butene and isobutylene; acrylic acid and its salts; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate and octadecyl acrylate; methacrylic acid and its salts; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate and octadecyl methacrylate; acrylamide derivatives such as acrylamide, N-methylacrylamide, N-ethylacrylamide, N,N-dimethylacrylamide, diacetone acrylamide, acrylamide propanesulfonic acid and its salts, acrylamide propyldimethylamine and its salts or quaternary salts, and N-methylolacrylamide and its derivatives; methacrylamide derivatives such as methacrylamide, N-methylmethacrylamide, N-ethylmethacrylamide, methacrylamide propanesulfonic acid and its salts, methacrylamide propyldimethylamine and its salts or quaternary salts, N-methylolmethacrylamide and its derivatives; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether; nitriles such as acrylonitrile and methacrylonitrile; vinyl halides such as vinyl chloride and vinyl fluoride; vinyl idene halides such as vinylidene chloride and vinylidene fluoride; allyl compounds such as allyl acetate and allyl chloride; unsaturated dicarboxylic acids such as maleic acid, itaconic acid and fumaric acid, and their salts or esters; vinylsilyl compounds such as vinyltrimethoxysilane; and isopropenyl acetate. The amount of the other monomer involved in copolymerization is generally 10 mol % or less.

In polymerization of a vinyl ester monomer, a chain transfer agent can coexist for adjusting a polymerization degree of the resulting polyvinyl ester. Preferable examples of a chain transfer agent include aldehydes such as acetaldehyde, propionaldehyde, butylaldehyde and benzaldehyde; ketones such as acetone, methyl ethyl ketone, hexanone and cyclohexanone; mercaptans such as 2-hydroxyethane thiol and dodecyl mercaptan; halogenated hydrocarbons such as trichloroethylene and perchloroethylene, and, inter alia, aldehydes and ketones can be suitably used. The amount of the chain transfer agent depends on a chain transfer constant of the chain transfer agent added and a polymerization degree of a targeted polyvinyl ester, and generally it is desirably 0.1 to 10% by mass based on the polyvinyl ester.

For saponification of a polyvinyl ester, well-known alcoholysis or hydrolysis using a basic catalyst such as sodium hydroxide, potassium hydroxide and sodium methoxide or an acidic catalyst such as p-toluenesulfonic acid can be employed. Examples of a solvent which can be used in such a saponification reaction include alcohols such as methanol and ethanol; esters such as methyl acetate and ethyl acetate; ketones such as acetone and methyl ethyl ketone; and aromatic hydrocarbons such as benzene and toluene, which can be used alone or in combination of two or more. Particularly, it is convenient and preferable that the saponification is effected using methanol or a mixed solution of methanol and methyl acetate as a solvent in the presence of sodium hydroxide as a basic catalyst.

Examples of an unsaturated carboxylic acid or a derivative thereof which can be used in the present invention include unsaturated monocarboxylic acids such as acrylic acid, methacrylic acid, crotonic acid, isocrotonic acid, propynoic acid, 2-pentenoic acid, 4-pentenoic acid, 2-heptenoic acid, 2-octenoic acid, cinnamic acid, myristoleic acid, palmitoleic acid, oleic acid, elaidic acid, vaccenic acid, gadoleic acid, erucic acid, nervonic acid, linoleic acid, linolenic acid, eleostearic acid, stearidonic acid, arachidonic acid, eicosapentaenoic acid, clupanodonic acid, docosahexaenoic acid and sorbic acid; unsaturated dicarboxylic acids such as maleic acid, fumaric acid, itaconic acid, citraconic acid and mesaconic acid; unsaturated carboxylic anhydrides such as maleic anhydride, itaconic anhydride and citraconic anhydride; unsaturated carboxylic acid alkyl esters such as acrylic acid alkyl esters, methacrylic acid alkyl esters and crotonic acid alkyl esters; unsaturated dicarboxylic acid monoesters such as maleic acid monoalkyl esters including maleic acid monomethyl ester (monomethyl maleate), fumaric acid monoalkyl esters and itaconic acid monoalkyl esters; and unsaturated dicarboxylic acid diesters such as maleic acid dialkyl esters, fumaric acid dialkyl esters and itaconic acid dialkyl esters. These carboxylic acids can be used as a salt. A carboxylic acid or a salt thereof can be used alone or in combination of two or more.

Among these, an unsaturated carboxylic acid or a derivative thereof used in the present invention is preferably an unsaturated dicarboxylic acid, an unsaturated carboxylic acid anhydride or an unsaturated dicarboxylic acid monoester in the light of reactivity with a hydroxy group of a starting PVA. In the light of a higher boiling point and good handleability, an unsaturated carboxylic acid or a derivative thereof is more preferably maleic anhydride, citraconic acid, itaconic acid or maleic acid monoalkyl ester; in the light of reactivity, further preferably maleic anhydride, itaconic acid or a maleic acid monoalkyl ester; particularly preferably itaconic acid.

It is important that the modified PVA (A) contains 0.01 mol % or more and less than 2 mol % of double bonds derived from an unsaturated carboxylic acid or a derivative thereof in side chains. Here, "the modified PVA (A) contains 0.01 mol % or more and less than 2 mol % of double bonds derived from an unsaturated carboxylic acid or a derivative thereof in side chains" means that the modified PVA (A) contains double bonds derived from an unsaturated carboxylic acid or a derivative thereof in side chains, and the amount of the double bonds is 0.01 mol % or more and less than 2 mol % based on the total monomer units.

When suspension polymerization of a vinyl compound is carried out using a dispersion stabilizer for suspension polymerization containing a modified PVA (A) having less than 0.01 mol % of the above double bonds, polymerization stability is lowered, leading to a polymer containing many coarse particles and having many fisheyes. The amount of the above double bond is preferably 0.03 mol % or more.

Meanwhile, it is difficult to produce the modified PVA (A) having double bonds in an amount of 2 mol % or more, and, even if it is possible, productivity is low. A composition (C) containing such a modified PVA (A) has poor hue and, when being dissolved in water, generates insolubles. If a vinyl compound is suspension-polymerized using a dispersion stabilizer for suspension polymerization containing the above modified PVA (A) having double bonds in an amount of 2 mol % or more, a polymer obtained has poor hue and many fisheyes are formed. The amount of the above double bonds is preferably less than 1.7 mol %. The above double bond means a carbon-carbon double bond.

The amount of double bonds derived from an unsaturated carboxylic acid or a derivative thereof in a modified PVA (A) can be measured by a known method. Specifically, measurement by $^1$H-NMR is convenient. When the amount of double bonds derived from an unsaturated carboxylic acid or a derivative thereof in a modified PVA (A) is measured, it is preferable that purification is conducted by removing the unreacted unsaturated carboxylic acid or a derivative thereof before measurement. A purification method is, but not limited to, for example, a method of washing with a solution which cannot dissolve the modified PVA(A) but can dissolve an unreacted unsaturated carboxylic acid or a derivative thereof can be used. For the purification, a reprecipitation method is convenient and preferable, wherein the modified PVA (A) is first dissolved in water to give an aqueous solution with about 1 to 20% by mass, and then the aqueous solution is added dropwise to a solution which cannot dissolve the modified PVA (A) but can dissolve the unreacted unsaturated carboxylic acid or a derivative thereof, to precipitate the modified PVA (A).

A saponification degree of the modified PVA (A) is 65 mol % or more and less than 77 mol %. A saponification degree of the modified PVA (A) is preferably 67 mol % or more. Meanwhile, a saponification degree of the modified PVA (A) is preferably less than 75 mol %. A saponification degree is determined in accordance with JIS-K6726 (1994).

A viscosity-average polymerization degree of the modified PVA (A) is 400 or more and less than 1500. A viscosity-average polymerization degree of the modified PVA (A) is preferably 500 or more. Meanwhile, a viscosity-average polymerization degree of the modified PVA (A) is preferably less than 1000, more preferably less than 900. When a saponification degree is less than 99.5 mol %, it is saponified to give a PVA with a saponification degree of 99.5 mol % or more, for which a viscosity-average polymerization degree (P) is determined in accordance with the following equation, using a limiting viscosity [η] (liter/g) measured at 30° C. in water.

$$P=([\eta]\times 10^4/8.29)^{(1/0.62)}$$

(Compound (B))

A compound (B) in the present invention is a compound having a conjugated double bond and two or more hydroxy groups bonded to the conjugated double bond, or a salt or oxide thereof. Herein, a hydroxy group bonded to a conjugated double bond denotes a hydroxy group bonded to a carbon constituting a conjugated carbon-carbon double bond.

An example of a compound having conjugated double bonds is a conjugated polyene having a structure of alternately connected carbon-carbon double bonds and carbon-carbon single bonds. Examples of a conjugated polyene include a conjugated diene having a structure of alternately connected two carbon-carbon double bonds and one carbon-carbon single bond, and a conjugated triene having alternately connected three carbon-carbon double bonds and two carbon-carbon single bonds.

The above conjugated polyene include a conjugated polyene having a plurality of conjugated double bonds consisting of a plurality of carbon-carbon double bonds in one molecule which are not mutually conjugated. The conjugated polyene can be linear or cyclic.

Furthermore, a compound having conjugated double bonds include, in addition to the above conjugated polyenes, aromatic hydrocarbons such as benzene, and α,β-unsaturated carbonyl compounds having a carbon-carbon double bond conjugated with an intramolecular carbonyl group.

In compound (B), hydroxy groups can be bonded at any position as long as they are bonded to a carbon constituting a conjugated carbon-carbon double bond, and the total number of hydroxy groups must be two or more. When the compound having conjugated double bonds is a conjugated polyene, it can be a compound having hydroxy groups bonded to an unsaturated carbon. When the compound having conjugated double bonds is an aromatic hydrocarbon, it can be a compound having hydroxy groups bonded to a carbon constituting the aromatic ring. When the compound having conjugated double bonds is an α,β-unsaturated carbonyl compound, it can be a compound having hydroxy groups bonded at α- and β-positions.

Among these, a compound (B) is preferably a compound having two or more hydroxy groups bonded to a carbon constituting an aromatic ring, or a salt or oxide thereof in the light of further preventing coloring of a vinyl polymer obtained and fisheyes in the vinyl polymer.

An example of a compound having two or more hydroxy groups bonded to a carbon constituting an aromatic ring is a polyphenol. The polyphenol can be a hydroxybenzene. Examples of a hydroxybenzene include benzenediols such as hydroquinone, catechol and resorcinol; benzenetriols such as pyrogallol, phloroglucinol and hydroxyquinol; and hexahydroxybenzene. Examples of the polyphenol can include phenolic carboxylic acids such as gallic acid; phenolic carboxylic acid esters such as gallic acid alkyl esters; and catechins such as epicatechin, epigallocatechin and epigallocatechin 3-gallate. Examples of a gallic acid alkyl ester include methyl gallate, ethyl gallate, propyl gallate, octyl gallate and dodecyl gallate.

Among these, a compound (B) is preferably a hydroxybenzene, a phenolic carboxylic acid or a phenolic carboxylic acid ester, more preferably benzenediol, gallic acid or a gallic acid alkyl ester, further preferably hydroquinone or a gallic acid alkyl ester, and in the light of safety, particularly preferably a gallic acid alkyl ester.

An example of a compound having hydroxy groups bonded to an $\alpha,\beta$-unsaturated carbonyl compound at $\alpha$- and $\beta$-positions is ascorbic acid.

A compound (B) used in the present invention can be a salt of the above compound. A salt herein denotes a metal alkoxide in which a hydrogen atom of a hydroxy group bonded to a conjugated double bond is replaced with a metal atom, or a carboxylate salt in which a hydrogen atom of an intramolecular carboxyl group is replaced with a metal atom. Example of the metal include sodium and potassium. Examples of a salt of a compound having two or more hydroxy groups bonded to a conjugated double bond include gallic acid salts such as sodium gallate; and ascorbic acid salts such as sodium ascorbate.

A compound (B) used in the present invention can be an oxide of the above compound. An oxide herein denotes a compound in which a hydroxy group bonded to a conjugated double bond is oxidized. Examples of such a compound include benzoquinone and dehydroascorbic acid.

In the light of performance of a composition (C) as a dispersion stabilizer for suspension polymerization, a compound (B) is herein preferably a compound having a conjugated double bond and two or more hydroxy groups bonded to the conjugated double bond, more preferably a compound having two or more hydroxy groups bonded to a conjugated double bond.

(Production Method for Composition (C))

A composition (C) in the present invention contains a modified polyvinyl alcohol (A) and a compound (B). A suitable production method for a composition (C) is, but not limited to, a method comprising reacting a PVA (D) (starting PVA) and an unsaturated carboxylic acid or a derivative thereof in the presence of a compound (B). Here, preferably, the reaction is carried out under heating for accelerating the reaction. A heating temperature is preferably 80 to 180° C. A heating time can be appropriately selected in relation to a heating temperature, and is generally 10 minutes to 24 hours.

A starting PVA is reacted with an unsaturated carboxylic acid or a derivative thereof in the presence of a compound (B), preferably by a method comprising preparing a solution by dissolving the unsaturated carboxylic acid or a derivative thereof and the compound (B) in a liquid, adding powder of the starting PVA to the solution to make the powder swollen, removing the solution to provide a mixed powder and heating the mixed powder. The reaction in a solid in the presence of the compound (B) as described above can prevent an undesirable crosslinking reaction from proceeding and provide a composition (C) having good water solubility. By this reaction method, a powder consisting of the composition (C) can be provided. Examples of a liquid which can dissolve the compound (B) include alcohols such as methanol, ethanol and propanol; and water. The liquid can be removed by heating or reducing pressure, preferably by reducing pressure.

In the above reaction method, a content of the unsaturated carboxylic acid or a derivative thereof in the mixed powder before heating is preferably 0.01 parts by mass or more, more preferably 0.1 parts by mass or more, particularly preferably 0.5 parts by mass or more based on 100 parts by mass of the starting PVA. Meanwhile, a content of the unsaturated carboxylic acid or a derivative thereof in the mixed powder before heating is preferably 10 parts by mass or less, more preferably 7 parts by mass or less, further preferably 5 parts by mass or less, particularly preferably 3.5 parts by mass or less based on 100 parts by mass of the starting PVA. For the composition (C), the starting PVA contained in the mixed powder before heating is converted to a modified PVA (A) while the compound (B) remains as it is.

It is essential in the present invention that a content of the compound (B) in the composition (C) is 0.001 parts by mass or more and less than 5 parts by mass based on 100 parts by mass of the modified PVA (A). If a content of the compound (B) in the composition (C) is less than 0.001 parts by mass based on 100 parts by mass of the modified PVA (A), hue of the composition (C) obtained is deteriorated. Furthermore, when the composition (C) is dissolved in water, insolubles are generated. If such a composition (C) is used as a dispersion stabilizer for suspension polymerization of a vinyl compound, a polymer obtained has poor hue and many fisheyes. A content of the compound (B) in the composition (C) is preferably 0.005 parts by mass or more, more preferably 0.01 parts by mass or more, further preferably 0.05 parts by mass or more based on 100 parts by mass of the modified PVA (A).

If a content of the compound (B) in the composition (C) is 5 parts by mass or more based on 100 parts by mass of the modified PVA (A), when the composition (C) is used as a dispersion stabilizer for suspension polymerization of a vinyl compound, vinyl polymer particles obtained have a larger average particle size and many coarse particles are formed. Furthermore, fisheyes in a vinyl polymer obtained are increased. A content of the compound (B) in the composition (C) is preferably 3 parts by mass or less, more preferably 2 parts by mass or less, further preferably 1 part by mass or less.

A shape of the composition (C) is preferably, but not limited to, a powder in the light of a dissolution rate in water. Here, a particle size of the powder is generally 50 to 2000 µm. A particle size of powder is an average particle size determined in accordance with JIS-K6726 (1994).

A yellow index (hereinafter, sometimes abbreviated as "YI") of a powder consisting of the composition (C) is preferably less than 50. If a YI is 50 or more, when the composition (C) is used as a dispersion stabilizer for suspension polymerization of a vinyl compound, hue of a vinyl polymer obtained may be deteriorated. A YI is more preferably 40 or less, further preferably 30 or less. Herein, a YI is a measured and calculated value in accordance with JIS-Z8722 (2009) and JIS-K7373 (2006).

[Polyvinyl Alcohol (E)]

A polyvinyl alcohol (E) (hereinafter, abbreviated as "PVA (E)") used with a composition (C) in the present invention, which may be unmodified or modified, has a saponification degree and a viscosity-average polymerization degree, both of which are different from those of a modified PVA (A) contained in the composition (C). A saponification degree of the PVA (E) is 77 mol % or more and less than 97 mol %.

A saponification degree of the PVA (E) is preferably 80 mol % or more, more preferably 82 mol % or more. Meanwhile, a saponification degree of the PVA (E) is preferably less than 95 mol %, more preferably less than 92 mol %. A saponification degree is determined in accordance with JIS-K6726 (1994).

A viscosity-average polymerization degree of a PVA (E) is 1500 or more and less than 5000. A viscosity-average polymerization degree of a PVA (E) is preferably 1800 or more. Meanwhile, a viscosity-average polymerization degree of a PVA (E) is preferably less than 4000, more preferably less than 3000, particularly preferably less than 2800. When a saponification degree is less than 99.5 mol %, it is saponified to give a PVA with a saponification degree of 99.5 mol % or more, for which a viscosity-average polymerization degree(P) is determined in accordance with the following equation, using a limiting viscosity [η] (liter/g) measured at 30° C. in water.

$$P=([\eta]\times 10^4/8.29)^{(1/0.62)}$$

(Method for Producing a Vinyl Polymer)

The present invention relates to a method for producing a vinyl polymer by suspension-polymerizing a vinyl compound in the presence of a dispersion stabilizer for suspension polymerization containing a composition (C) and a PVA (E). Using such a dispersion stabilizer in suspension polymerization of a vinyl compound, a polymerization reaction is stable and formation of coarse particles decreases. Furthermore, coloring of a vinyl polymer obtained and fisheyes in the polymer can be prevented.

In the dispersion stabilizer, a mass ratio (C/E) of the composition (C) to the PVA (E) is 50/50 to 90/10. When a mass ratio (C/E) of the composition (C) to the PVA (E) is within the above range, polymerization of the vinyl compound becomes more stable and a particle size of vinyl polymer particles obtained becomes more uniform. The mass ratio (C/E) is preferably 55/45 to 80/20.

The above dispersion stabilizer for suspension polymerization can contain various additives other than the compound (C) and the PVA (E), without departing from the scope of the present invention. Examples of such additives include a polymerization regulator such as aldehydes, halogenated hydrocarbons and mercaptans; a polymerization inhibitor such as phenol compounds, sulfur-containing compounds and N-oxides; a pH regulator; a cross-linker; a preservative; a mildew-proofing agent; a blocking inhibitor; a defoamer; and a compatibilizing agent. A content of the various additives in the dispersion stabilizer for suspension polymerization is preferably 10% by mass or less, more preferably 5% by mass or less based on the total amount of the compound (C) and the PVA (E).

There are no particular restrictions to a method for charging the above dispersion stabilizer into a polymerization tank. Examples of the charging method include, but not limited to, (i) a method in which the PVA (E) and the composition (C) as powder are blended and then dissolved in water, and the aqueous solution is charged into a polymerization tank, (ii) a method in which the composition (C) and the PVA (E) are separately dissolved in water to prepare aqueous solutions, which are then combined and the resulting aqueous solution is charged into a polymerization tank, (iii) a method in which the composition (C) and the PVA (E) are separately dissolved in water to prepare aqueous solutions, which are not combined, but are separately charged into a polymerization tank, and (iv) a method in which the composition (C) and the PVA (E) are charged as powder. In the light of homogeneity in a polymerization tank, any of the above methods (i), (ii) and (iii) is preferable.

Examples of a vinyl compound used in a method for producing a vinyl polymer of the present invention include halogenated vinyls such as vinyl chloride; vinyl esters such as vinyl acetate and vinyl propionate; acrylic acid, methacrylic acid, and esters and salts thereof; maleic acid, fumaric acid, and esters and anhydrides thereof; styrene; acrylonitrile; vinylidene chloride; and vinyl ethers. Among these, a dispersion stabilizer for suspension polymerization of the present invention is particularly preferably used in suspension polymerization of vinyl chloride alone or vinyl chloride in combination with a monomer copolymerizable with vinyl chloride. Examples of a monomer copolymerizable with vinyl chloride include vinyl esters such as vinyl acetate and vinyl propionate; (meth)acrylic acid esters such as methyl (meth)acrylate and ethyl (meth)acrylate; α-olefins such as ethylene and propylene; unsaturated dicarboxylic acids such as maleic anhydride and itaconic acid; acrylonitrile; styrene; vinylidene chloride; and vinyl ether.

In suspension polymerization of a vinyl compound, an oil-soluble or water-soluble polymerization initiator which has been conventionally used in polymerization of vinyl chloride can be used. Examples of an oil-soluble polymerization initiator include percarbonates compounds such as diisopropyl peroxydicarbonate, di-2-ethylhexyl peroxydicarbonate and diethoxyethyl peroxydicarbonate; perester compounds such as t-butyl peroxyneodecanoate, t-butyl peroxypivalate, t-hexyl peroxypivalate and α-cumyl peroxyneodecanoate; peroxides such as acetylcyclohexylsulfonyl peroxide, 2,4,4-trimethylpentyl-2-peroxyphenoxy acetate, 3,5,5-trimethylhexanoyl peroxide and lauroyl peroxide; and azo compounds such as azobis-2,4-dimethylvaleronitrile and azobis(4-2,4-dimethylvaleronitrile). Examples of a water-soluble polymerization initiator include potassium persulfate, ammonium persulfate, hydrogen peroxide and cumene hydroperoxide. These oil-soluble or water-soluble polymerization initiators can be used alone or in combination of two or more.

In suspension polymerization of a vinyl compound, there are no particular restrictions to a polymerization temperature, and it can be adjusted to a lower temperature such as about 20° C., or a high temperature over 90° C. Furthermore, a polymerization vessel equipped with a reflux condenser can be used in order to increase a cooling efficiency of a polymerization reaction system.

In suspension polymerization of a vinyl compound, in addition to the composition (C) and the PVA (E), other additives can be combined, including a water-soluble cellulose ether such as methylcellulose, hydroxyethylcellulose, hydroxypropylcellulose and hydroxypropylmethylcellulose; a water-soluble polymer such as gelatin; an oil-soluble emulsifier such as sorbitan monolaurate, sorbitan trioleate, glycerin tristearate and ethylene oxide-propylene oxide block copolymer; and/or a water-soluble emulsifier such as polyoxyethylene sorbitan monolaurate, polyoxyethylene glycerin oleate and sodium laurate, and the like, which are commonly used for suspension polymerization of a vinyl compound in an aqueous medium. The amount of these is preferably, but not limited to, 0.01 parts by mass or more and 1.0 parts by mass or less based on 100 parts by mass of the vinyl compound.

A vinyl polymer obtained by the production method of the present invention which appropriately contains, for example, a plasticizer, can be used for various molded articles.

EXAMPLES

There will be further detailed the present invention with reference to Examples. In the following Examples and Comparative Examples, "part(s)" and "%" denote, unless otherwise stated, part(s) by mass and % by mass, respectively.

[Viscosity-Average Polymerization Degree of PVA]

A viscosity-average polymerization degree of a PVA was determined in accordance with JIS-K6726 (1994). Specifically, when a saponification degree is less than 99.5 mol %, it is saponified to give a PVA with a saponification degree of 99.5 mol % or more, for which a viscosity-average polymerization degree(P) was determined in accordance with the following equation, using a limiting viscosity [η] (liter/g) measured at 30° C. in water.

$$P=([\eta]\times 10^4/8.29)^{(1/0.62)}$$

[Saponification Degree of PVA]

A saponification degree of a PVA was determined as described in JIS-K6726 (1994). A saponification degree of a modified PVA (A) was determined for a modified PVA (A) isolated by reprecipitating a powder consisting of the composition (C) obtained.

[Amount of Double Bonds Introduced into a Modified PVA (A)]

A 10% aqueous solution of composition (C) was prepared. Five grams of this aqueous solution was added dropwise to a solution of 500 g of methyl acetate/water=95/5, to precipitate a modified PVA (A), which was then collected and dried. For the modified PVA (A) thus isolated, the amount of double bonds introduced into the modified PVA (A) was determined by $^1$H-NMR. Here, the amount of double bonds is the amount of double bonds based on the total monomer units of the modified PVA (A).

[Water-Insolubles in an Aqueous Solution of a Composition (C)]

A 10% aqueous solution of a composition (C) prepared for measuring the amount of double bonds introduced into the above modified PVA (A) was visually observed for the presence of insolubles.

[Yellow Index (YI) of a Powder Consisting of a Composition (C)]

A powder consisting of a composition (C), after removing particles with a size of less than 100 μm and more than 1000 μm using sieves (mesh size: 100 μm, 1000 μm), was measured for a yellow index (YI) of a powder consisting of a composition (C) using a color meter (Suga Test Instruments Co., Ltd., SM-T-H1). A yellow index is measured and calculated in accordance with JIS-Z8722 (2009) and JIS-K7373 (2006).

Production Example 1 (Production of Composition 1)

In 150 parts of methanol were dissolved 0.88 parts of maleic anhydride as an unsaturated carboxylic acid and 0.1 parts of propyl gallate as a compound (B), to prepare a solution. To the solution was added 100 parts of PVA-1 (viscosity-average polymerization degree: 800, saponification degree: 72 mol %) as a starting PVA for swelling, and then methanol was removed under reduced pressure. Then, the resulting mixed powder was heated at 105° C. for 4 hours, to provide, as a composition (C), powdery composition 1 containing a modified PVA (A) having double bonds derived from maleic anhydride in side chains and compound (B). For the modified PVA (A), a peak of an introduced double bond was observed near at 6.0 to 6.5 ppm, and the amount of the double bond was 0.12 mol %. The above modified PVA (A) had a viscosity-average polymerization degree of 800, a saponification degree of 72 mol %. Powdery composition 1 had a yellow index (YI) of 20.2. Composition 1 had a particle size of 530 μm as determined in accordance with JIS-K6726 (1994). Furthermore, a 10% aqueous solution of composition 1 was prepared and no insolubles were observed in the aqueous solution.

Production Examples 2 to 19 (Production of Compositions 2 to 19)

Compositions 2 to 17 were produced as described for composition 1, except that a starting PVA, the type and the amount of an unsaturated carboxylic acid or a derivative thereof, the type and the amount of a compound (B), a heating temperature and a heating time were changed. Table 1 shows the production conditions and the production results.

TABLE 1

| Composition (C) (type) | Modified PVA(A) | | | | | | Heating conditions |
|---|---|---|---|---|---|---|---|
| | Starting PVA | | Unsaturated carboxylic acid or a derivative thereof | | Compound (B) | | |
| | Type*1 | Amount (parts) | Type | Amount (parts) | Type | Amount (parts) | Temperature (° C.) |
| Composition 1 | PVA-1 | 100 | Maleic anhydride | 0.88 | Propyl gallate | 0.1 | 105 |
| Composition 2 | PVA-1 | 100 | Citraconic acid | 1.17 | Propyl gallate | 0.1 | 120 |
| Composition 3 | PVA-1 | 100 | Itaconic acid | 2.34 | Propyl gallate | 0.1 | 120 |
| Composition 4 | PVA-1 | 100 | Monomethyl maleate | 1.17 | Hydroquinone | 0.1 | 105 |
| Composition 5 | PVA-1 | 100 | Citraconic acid | 1.33 | Propyl gallate | 3 | 120 |
| Composition 6 | PVA-1 | 100 | Citraconic acid | 1.33 | Propyl gallate | 0.008 | 120 |
| Composition 7 | PVA-1 | 100 | Itaconic acid | 4.68 | Propyl gallate | 0.1 | 140 |
| Composition 8 | PVA-1 | 100 | Itaconic acid | 10 | Propyl gallate | 0.3 | 140 |
| Composition 9 | PVA-1 | 100 | Itaconic acid | 1 | Propyl gallate | 0.1 | 105 |
| Composition 10 | PVA-2 | 100 | Citraconic acid | 0.8 | Propyl gallate | 0.1 | 120 |
| Composition 11 | PVA-3 | 100 | Citraconic acid | 0.8 | Propyl gallate | 0.1 | 120 |
| Composition 12 | PVA-1 | 100 | — | — | Propyl gallate | 0.1 | 120 |
| Composition 13 | PVA-1 | 100 | Itaconic acid | 2.34 | — | — | 130 |
| Composition 14 | PVA-1 | 100 | Citraconic acid | 0.3 | — | — | 120 |
| Composition 15 | PVA-1 | 100 | Itaconic acid | 2.34 | Sorbic acid | 0.3 | 120 |

TABLE 1-continued

| | | | | | | |
|---|---|---|---|---|---|---|
| Composition 16 | PVA-1 | 100 | Itaconic acid | 0.2 | Propyl gallate | 0.1 | 120 |
| Composition 17 | PVA-1 | 100 | Itaconic acid | 18 | Propyl gallate | 0.3 | 140 |
| Composition 18 | PVA-1 | 100 | Maleic acid | 2 | — | — | 130 |
| Composition 19 | PVA-1 | 100 | Citraconic acid | 1.17 | Propyl gallate | 7 | 120 |

| | | Evaluation results of composition (C) | | | | |
|---|---|---|---|---|---|---|
| | | Modified PVA (A) | | | | |
| Composition (C) (type) | Heating conditions Time (h) | Viscosity- average polymerization degree | Saponification degree (mol %) | Amount of introduced double bond (mol %) | Powder YI | Insolubles in an aqueous solution |
| Composition 1 | 4 | 800 | 72 | 0.12 | 20.2 | No |
| Composition 2 | 4 | 800 | 72 | 0.15 | 23.5 | No |
| Composition 3 | 4 | 800 | 72 | 0.17 | 29.3 | No |
| Composition 4 | 4 | 800 | 72 | 0.12 | 20.3 | No |
| Composition 5 | 4 | 800 | 72 | 0.18 | 17.4 | No |
| Composition 6 | 4 | 800 | 72 | 0.14 | 39.5 | No |
| Composition 7 | 4 | 800 | 71 | 0.55 | 39.8 | No |
| Composition 8 | 4 | 800 | 70 | 1.40 | 46.1 | No |
| Composition 9 | 4 | 800 | 72 | 0.03 | 16.9 | No |
| Composition 10 | 4 | 2400 | 88 | 0.08 | 19.4 | No |
| Composition 11 | 4 | 3500 | 88 | 0.08 | 17.4 | No |
| Composition 12 | 4 | 800 | 72 | — | 28.5 | No |
| Composition 13 | 4 | 800 | 72 | 0.13 | 70.5 | Yes |
| Composition 14 | 4 | 800 | 72 | 0.03 | 60.1 | No |
| Composition 15 | 4 | 800 | 72 | 0.08 | 62.9 | Yes |
| Composition 16 | 4 | 800 | 72 | 0.005 | 27.2 | No |
| Composition 17 | 4 | 800 | 69 | 2.04 | 65.3 | Yes |
| Composition 18 | 1 | 800 | 72 | 0.35 | 59.2 | Yes |
| Composition 19 | 4 | 800 | 72 | 0.15 | 23.4 | No |

*1)
PVA-1: Kuraray Co., Ltd. "L-508W" Polymerization degree: 800, Saponification degree: 72 mol %
PVA-2: Kuraray Co., Ltd. "poval44-88" Polymerization degree: 2400, Saponification degree: 88 mol %
PVA-3: Kuraray Co., Ltd. "poval95-88" Polymerization degree: 3500, Saponification degree: 88 mol %

Example 1

Composition 1 as a dispersion stabilizer for suspension polymerization was dissolved in deionized water and 100 parts thereof was charged in an autoclave. A concentration of composition 1 in the aqueous solution was 600 ppm based on the charged vinyl chloride. Then, as a PVA (E), a PVA with a viscosity-average polymerization degree of 2400 and a saponification degree of 88 mol % was dissolved in deionized water and 100 parts thereof was charged in the autoclave. A concentration of the PVA (E) was 360 ppm based on the charged vinyl chloride. Subsequently, deionized water was added in such an amount that the total amount of deionized water was to be 1200 parts.

Then, in the autoclave were charged 0.65 parts of a 70% solution of cumyl peroxyneodecanoate in toluene and 1.05 parts of a 70% solution of t-butyl peroxyneododecanoate in toluene, and then nitrogen was introduced into the autoclave to a pressure of 0.2 MPa. Next, nitrogen purge operation was repeated five times in total for fully nitrogen-substituting the atmosphere in the autoclave to remove oxygen, and then 940 parts of vinyl chloride was charged. The content in the autoclave was heated with stirring to 57° C. to initiate polymerization of vinyl chloride. A pressure of the autoclave was 0.80 MPa at the time of polymerization initiation. After 3.5 hours from the polymerization initiation, a pressure of the autoclave became 0.70 MPa and at that point, the polymerization was terminated and unreacted vinyl chloride was removed. Then, the polymerization reaction product was removed and dried at 65° C. for 16 hours, to afford a vinyl polymer (vinyl chloride polymer particles). The particles produced were evaluated as described below. The evaluation results are shown in Table 2.

(Evaluation of Vinyl Chloride Polymer Particles)

The vinyl chloride polymer particles obtained were evaluated for (1) an average particle size, (2) a particle size distribution, (3) fisheyes and (4) hue (yellow index: YI) as described below. The evaluation results are shown in Table 2.

(1) Average Particle Size

A particle size distribution was measured by a dry sieve method described in JIS-Z8815 (1994), using a Tyler mesh screen. From the results, an average particle size was calculated using a Rosin-Rammler plot.

(2) Particle Size Distribution

A content of JIS standard sieve 42 mesh-on is given in mass %. The evaluation results are shown in Table 2.
  A: less than 0.5%
  B: 0.5% or more and less than 1%
  C: 1% or more A content of JIS standard sieve 60 mesh-on is given in mass %. The evaluation results are shown in Table 2.
  A: less than 5%
  B: 5% or more and less than 10%
  C: 10% or more A smaller content for both 42 mesh-on and 60 mesh-on demonstrates a smaller amount of coarse particles and sharper particle size distribution, which means excellent polymerization stability.

(3) Fisheyes 100 parts of the vinyl chloride polymer particles obtained, 50 parts of DOP (dioctyl phthalate), 5 parts of tribasic lead sulfate and 1 part of zinc stearate were roll-kneaded at 150°

C. for 7 minutes, to produce a sheet with a thickness of 0.1 mm, for which the number of fisheyes per 1000 cm² was determined.

(4) Hue (YI)

100 parts of the vinyl chloride polymer particles obtained, 3 parts of TVS#N-2000E (Nitto Kasei Co., Ltd.) as a tin-containing stabilizer, and 0.01 parts of ultramarine blue were roll-kneaded in a thickness of 0.4 mm at 170° C. for 10 minutes. The sheet obtained was hot-pressed at 185° C. under a pressure of 120 kg/cm² for 5 minutes, and then pressed under cooling at 20° C. under a pressure of 150 kg/cm² for 5 minutes, to produce a 42×25×5 mm thick film.

For the thick film produced, hue (YI) was determined in accordance with JIS-K7105 (1981) using a color meter (Suga Test Instruments Co., Ltd., SM-T-H1). A larger value demonstrates that the vinyl chloride polymer was decomposed by heating, leading to yellow coloring.

Examples 2 to 9

Vinyl chlorides were suspension-polymerized as described for Example 1, except that the types and the amounts of a composition (C) used as a dispersion stabilizer for suspension polymerization, and the types and the amounts of a PVA (E) were changed. The conditions and the results are shown in Table 2.

Comparative Example 1

A vinyl chloride was suspension-polymerized as described for Example 1, except that the amounts of the composition 1 and the PVA (E) were changed as shown in Table 2. The results are shown in Table 2. Since the amount of the composition (C) was too small, polymerization was unstable, an average particle size of the vinyl chloride polymer particles obtained was large, a rate of coarse particles was high, and many fisheyes were formed.

Comparative Example 2

A vinyl chloride was suspension-polymerized as described for Example 1, except that composition 10 was used as a composition (C) and a PVA (E) was absent. The results are shown in Table 2. Since a PVA (E) was absent, polymerization was unstable, an average particle size of the vinyl chloride polymer particles obtained was large, a rate of coarse particles was high, and many fisheyes were formed.

Comparative Example 3

A vinyl chloride was suspension-polymerized as described for Example 1, except that composition 11 was used as a composition (C). The results are shown in Table 2. Since a polymerization degree and a saponification degree of the modified PVA (A) contained in composition 11 were too high, and a polymerization degree and a saponification degree of the PVA (E) were too low, an average particle size of the vinyl chloride polymer particles obtained was large, a rate of coarse particles was high, and many fisheyes were formed.

Comparative Example 4

A vinyl chloride was suspension-polymerized as described for Example 1, except that composition 12 was used as a composition (C). The results are shown in Table 2. Since no double bonds derived from an unsaturated carboxylic acid or unsaturated carboxylic acid derivative were introduced in composition 12, polymerization was unstable, an average particle size of the vinyl chloride polymer particles obtained was large, a rate of coarse particles was high, and many fisheyes were formed.

Comparative Example 5

A vinyl chloride was suspension-polymerized as described for Example 1, except that composition 13 was used as a composition (C). The results are shown in Table 2. Since composition 13 did not contain a compound (B), composition 13 itself had poor hue, the vinyl chloride polymer obtained by suspension polymerization using it had poor hue and many fisheyes were formed. When a 10% aqueous solution of composition 13 was prepared, insolubles were observed in the aqueous solution.

Comparative Example 6

A vinyl chloride was suspension-polymerized as described for Example 1, except that composition 14 was used as a composition (C). The results are shown in Table 2. Since composition 14 did not contain a compound (B), composition 14 itself had poor hue, the vinyl chloride polymer obtained by suspension polymerization using it had poor hue and many fisheyes were formed.

Comparative Example 7

A vinyl chloride was suspension-polymerized as described for Example 1, except that composition 15 was used as a composition (C). The results are shown in Table 2. Since composition 15 contained sorbic acid (a compound which does not contain two or more hydroxy groups bonded to a conjugated double bond) as a compound (B), composition 15 itself had poor hue, the vinyl chloride polymer obtained by suspension polymerization using it had poor hue and many fisheyes were formed. When a 10% aqueous solution of composition 15 was prepared, insolubles were observed in the aqueous solution.

Comparative Example 8

A vinyl chloride was suspension-polymerized as described for Example 1, except that composition 16 was used as a composition (C). The results are shown in Table 2. Since the modified PVA (A) in composition 16 had a less amount of double bonds derived from an unsaturated carboxylic acid or a derivative thereof, polymerization was unstable, an average particle size of the vinyl chloride polymer particles obtained was large, a rate of coarse particles was high, and many fisheyes were formed.

Comparative Example 9

A vinyl chloride was suspension-polymerized as described for Example 1, except that composition 17 was used as a composition (C). The results are shown in Table 2. Since the modified PVA (A) in composition 17 had a more amount of double bonds derived from an unsaturated carboxylic acid or a derivative thereof, the composition 17 itself had poor hue, the vinyl chloride polymer obtained by suspension polymerization using it had poor hue and many fisheyes were formed. When a 10% aqueous solution of composition 17 was prepared, insolubles were observed in the aqueous solution.

Comparative Example 10

A vinyl chloride was suspension-polymerized as described for Example 1, except that composition 18 was used as a composition (C). The results are shown in Table 2. Since composition 18 did not contain a compound (B), composition 18 itself had poor hue, the vinyl chloride polymer obtained by suspension polymerization using it had poor hue and many fisheyes were formed. When a 10% aqueous solution of composition 18 was prepared, insolubles were observed in the aqueous solution.

Comparative Example 11

A vinyl chloride was suspension-polymerized as described for Example 1, except that composition 19 was used as a composition (C). The results are shown in Table 2. Since composition 19 contained a more amount of the compound (B), polymerization was unstable, an average particle size of the vinyl chloride polymer particles obtained was large, a rate of coarse particles was high, and many fisheyes were formed.

As shown in Examples, a vinyl chloride polymer produced with excellent polymerization stability, which has excellent hue and in which formation of coarse particles and fisheyes is reduced, can be provided by using a particular composition and a particular PVAS as a dispersion stabilizer for suspension polymerization in production of the vinyl chloride polymer. Industrial utility of the present invention is, therefore, extremely high.

The invention claimed is:

1. A method for producing a vinyl polymer, the method comprising:
   suspension-polymerizing a vinyl compound in the presence of a dispersion stabilizer for suspension polymerization,
   wherein the dispersion stabilizer comprises:
   a composition (C) comprising a modified polyvinyl alcohol (A);
   a compound (B); and
   a polyvinyl alcohol (E),
   wherein the modified polyvinyl alcohol (A) comprises 0.01 mol % or more and less than 2 mol % of double bonds derived from an unsaturated carboxylic acid or a derivative thereof in side chains;
   wherein the modified polyvinyl alcohol (A) has a saponification degree of 67 mol % or more and less than 77 mol % and a viscosity-average polymerization degree of 400 or more and less than 1500;
   wherein the compound (B) is a compound having two or more hydroxy groups bonded to a conjugated double bond, or a salt or oxide thereof;
   wherein the polyvinyl alcohol (E) has a saponification degree of 77 mol % or more and less than 97 mol % and a viscosity-average polymerization degree of 1500 or more and less than 5000;
   wherein a content of the compound (B) in the composition (C) is 0.001 parts by mass or more and less than 5 parts by mass based on 100 parts by mass of the modified polyvinyl alcohol (A); and

TABLE 2

| | Dispersion stabilizer for suspension polymerization | | PVA(E) | | | Evaluation results of vinyl chloride polymer particles | | | |
|---|---|---|---|---|---|---|---|---|---|
| | | Charge | | Saponification | Amount | Average particle | Particle size distribution | | |
| | Type | (ppm/vinyl chloride) | Polymerization degree | degree (mol %) | (ppm/vinyl chloride) | size (μm) | 42 mesh-on | 60 mesh-on | Fisheyes (number) | YI |
| Example 1 | Composition 1 | 600 | 2400 | 88 | 360 | 140.4 | A | A | 0 | 26.0 |
| Example 2 | Composition 2 | 600 | 2400 | 88 | 360 | 142.3 | A | A | 0 | 26.2 |
| Example 3 | Composition 3 | 600 | 2400 | 88 | 360 | 136.3 | A | A | 0 | 26.5 |
| Example 4 | Composition 4 | 600 | 2400 | 88 | 360 | 139.2 | A | A | 0 | 25.6 |
| Example 5 | Composition 5 | 600 | 2400 | 88 | 360 | 137.2 | A | A | 0 | 25.3 |
| Example 6 | Composition 6 | 600 | 2400 | 88 | 360 | 145.2 | B | A | 5 | 28.4 |
| Example 7 | Composition 7 | 600 | 2400 | 88 | 360 | 129.7 | A | A | 0 | 27.9 |
| Example 8 | Composition 8 | 600 | 2400 | 88 | 360 | 118.2 | A | A | 1 | 29.3 |
| Example 9 | Composition 9 | 600 | 2400 | 88 | 360 | 166.3 | B | A | 7 | 25.4 |
| Comparative Example 1 | Composition 1 | 360 | 2400 | 88 | 600 | 169.5 | B | B | 9 | 26.5 |
| Comparative Example 2 | Composition 10 | 600 | — | — | — | 223.4 | C | C | 243 | 26.4 |
| Comparative Example 3 | Composition 11 | 600 | 800 | 72 | 360 | 196.0 | C | B | 43 | 27.3 |
| Comparative Example 4 | Composition 12 | 600 | 2400 | 88 | 360 | 221.2 | C | C | 87 | 26.3 |
| Comparative Example 5 | Composition 13 | 600 | 2400 | 88 | 360 | 157.3 | B | A | 150 | 37.9 |
| Comparative Example 6 | Composition 14 | 600 | 2400 | 88 | 360 | 168.8 | B | B | 24 | 36.5 |
| Comparative Example 7 | Composition 15 | 600 | 2400 | 88 | 360 | 156.4 | B | A | 104 | 37.0 |
| Comparative Example 8 | Composition 16 | 600 | 2400 | 88 | 360 | 214.3 | C | C | 77 | 26.4 |
| Comparative Example 9 | Composition 17 | 600 | 2400 | 88 | 360 | 116.6 | B | A | 646 | 37.1 |
| Comparative Example 10 | Composition 18 | 600 | 2400 | 88 | 360 | 160.2 | B | B | 287 | 35.4 |
| Comparative Example 11 | Composition 19 | 600 | 2400 | 88 | 360 | 188.4 | C | B | 255 | 26.1 | wherein a mass ratio (C/E) of the composition (C) to the polyvinyl alcohol (E) is 50/50 to 90/10.

2. The method of claim 1, wherein the compound (B) is a compound having two or more hydroxy groups bonded to a carbon constituting an aromatic ring, or a salt or oxide thereof.

3. The method of claim 1, wherein the composition (C) is a powder and the powder has a yellow index of less than 50.

4. The method of claim 2, wherein the composition (C) is a powder and the powder has a yellow index of less than 50.

* * * * *